(12) United States Patent
Wasmeier

(10) Patent No.: US 7,127,047 B2
(45) Date of Patent: Oct. 24, 2006

(54) METHOD AND APPARATUS FOR ESTABLISHING AND MAINTAINING VOICE COMMUNICATION AMONG A COMMUNITY OF INTEREST

(75) Inventor: Hans Wasmeier, Ottawa (CA)

(73) Assignee: Mitel Networks Corporation (CA)

( * ) Notice: Subject to any disclaimer, the term of this patent is extended or adjusted under 35 U.S.C. 154(b) by 361 days.

(21) Appl. No.: 10/339,996

(22) Filed: Jan. 10, 2003

(65) Prior Publication Data

US 2003/0133544 A1 Jul. 17, 2003

(30) Foreign Application Priority Data

Jan. 14, 2002 (GB) ................................. 0200746.6

(51) Int. Cl.
*H04M 1/64* (2006.01)
(52) U.S. Cl. .................................. 379/88.25; 709/207
(58) Field of Classification Search ............ 379/88.23, 379/88.24, 88.25, 201.1
See application file for complete search history.

(56) References Cited

U.S. PATENT DOCUMENTS

| 6,301,609 | B1 * | 10/2001 | Aravamudan et al. ...... 709/207 |
| 6,934,912 | B1 * | 8/2005 | Simpson et al. ............ 715/745 |
| 2002/0146097 | A1 * | 10/2002 | Vuori ...................... 379/88.22 |

FOREIGN PATENT DOCUMENTS

| CA | 2 403 520 | 9/2001 |
| EP | 0588510 | 3/1994 |
| GB | 2082420 | 3/1982 |
| WO | 9739566 | 10/1997 |
| WO | WO 01/11824 A2 | 2/2001 |

OTHER PUBLICATIONS

Search Report of Great Britain Application No. GB 0200746.6.

(Continued)

*Primary Examiner*—Gerald Gauthier
(74) *Attorney, Agent, or Firm*—F. Chau & Associates, LLC

(57) ABSTRACT

Apparatus is provided for establishing and maintaining communication among a community of interest, comprising a plurality of communication devices for voice communication between users of the community of interest, each of the communication devices including a display for indicating communication availability of the users, a plurality of device agents for controlling respective ones of the communication devices in establishing the voice communication and updating each the display. A plurality of user agents is provided for maintaining user preferences. The user preferences include a list of the users of the community of interest. A tuple space is provided for exchanging tuples and anti-tuples between the user agents to monitor the communication availability, in response to which respective ones of the device agents update each respective display. A transient voice store is provided for receiving and storing a voice message from a first one of the users to a second one of the users with whom the first user is desirous of communicating and who is indicated on the display of the first user as being available for communication, whereupon the display of the second user is updated to indicate receipt of the voice message, and for playing the voice message to the second user. A communication switch is provided for establishing two-way communication between the users, whereby in response to the second user listening to the voice message and provided that the first user is available for communication a voice path is created in the communication switch between the first user and the second user, and in the event the first user is no longer available for communication the second user stores a voice message for the first user via the transient message store.

19 Claims, 2 Drawing Sheets

OTHER PUBLICATIONS

Figure 2:
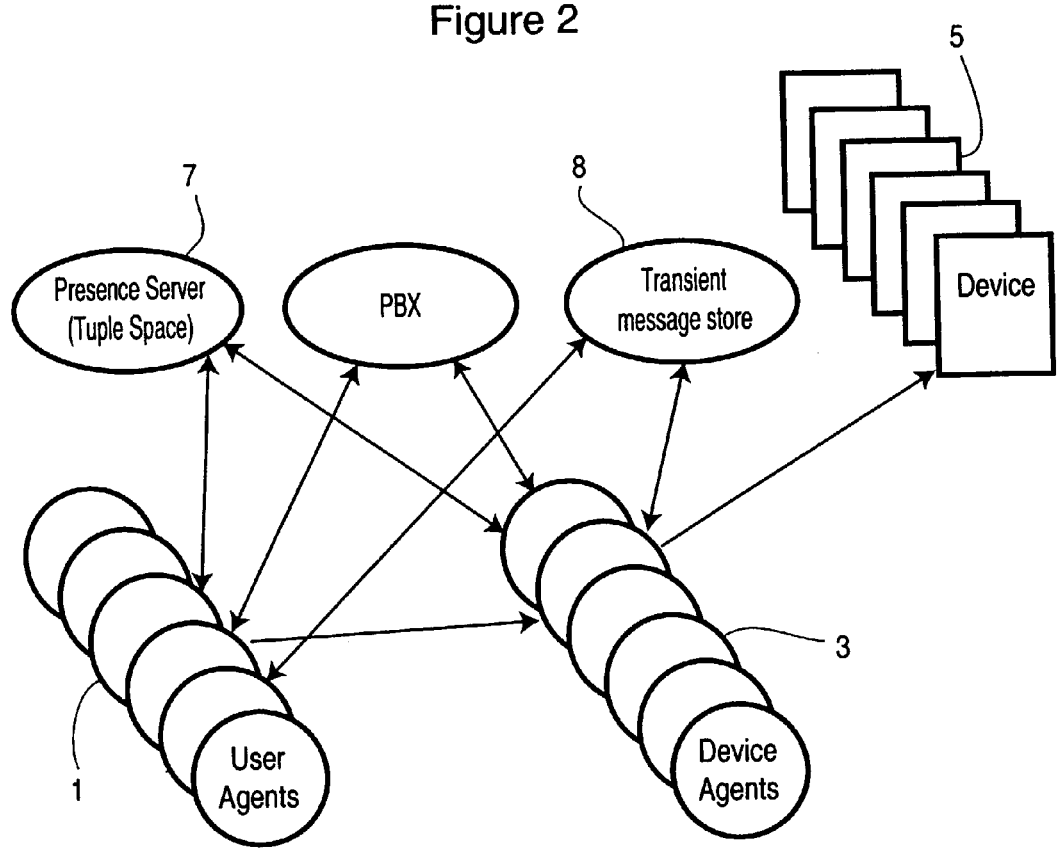

"Internet Telephony Workshop 2001 Technical Program"; http://www.fokus.gmd.de/events/iptel12001/pg/final_program/.

Shim, et al., "An Example of Using Presence and Availability in an Enterprise for Spontaneous, Multiparty, Multimedia Communications", Applied Research, Telcordia Technologies New Jersey, USA (hyongsop,chit.mlong.gcp.sid)@research.telcordia.com.

"Presence and Availability Management". http://www.pamforum.org/MainNav/pressrelease/pr_032400.html.

Connor, "Novell partners with Lucent on customizable identity services", http://www.nwfusion.com/news/2000/0522pam.html.

Michael, "Computer Telephony", http://www.cconvergence.com/article/CTM20001026S0002/1.

* cited by examiner

Figure 1

| | | | |
|---|---|---|---|
| <* | Doris Leafloor | Talk | 5 |
| * | Judy Vierich | Talk | |
| | H. Krausbar | Talk | 10 |
| * | Nick Tsiakas | Talk | 15 |
| * | B. Mcconnell | Talk | |
| | Ernst Munter | Talk | |
| | Lee Cox | Talk | 20 |
| <*> | Janet Bell | Talk | |

METHOD AND APPARATUS FOR ESTABLISHING AND MAINTAINING VOICE COMMUNICATION AMONG A COMMUNITY OF INTEREST

FIELD OF THE INVENTION

This invention relates generally to communication systems such as PBXs, and more particularly to a method and apparatus for establishing and maintaining voice communication among a community of interest in a communication system.

BACKGROUND OF THE INVENTION

Typical communication in a workplace is performed for the most part in an ad hoc manner. For example, one person may encounter another person in a hallway and make a passing comment on a topic of mutual interest, or drop by a person's desk to ask a question, etc. As a result of workplace proximity, communities of interest are established and informal communications proceed among members of such communities of interest.

By contrast, normal telephony communication is formal in nature in that a request to establish communications is submitted (i.e. a person dials a telephone number), and the destination party either accepts or rejects that request (i.e. the destination party answers the telephone or lets the telephone ring). As a result of the semi-strict rules by which communications must be established using traditional telephony equipment, ad hoc conversations among members of a community of interest cannot be supported.

If the call is declined or if the destination party is already on the telephone, the originator of the call is normally provided with an option of leaving a voicemail message for the destination party. Once a voicemail message has been left, then the destination party normally receives a form of audio or visual indication (e.g. flashing message light, etc.). Once the destination party is available, he/she may call into the voicemail system, determine who called and what was the message. Such strict and formal communication flow does not lend itself well to the typical short exchange of information that occurs between two co-located office workers within a community of interest.

Technological advances over the last decade have enabled members of a workforce to be in geographically disparate locations while working on a common project or set of projects. While this is convenient for any number of reasons, such geographical displacement reduces the ability of members within a community of interest to undertake ad hoc communications.

Currently 'buddy lists' are used on instant messaging systems like ICQ and AOL to indicate the availability status of other users that the user may wish to communicate with. These systems provide an effective text-based communication mechanism for members of a community of interest, but no practical systems are yet available for notifying users of communication mutual availability status and establishing ad-hoc verbal communication among members of a community of interest.

Busy lamp fields (BLFs) are also in telephone systems for providing attendants with an indication of communication availability status in the form of busy/idle indicators for the telephones in the system. BLFs are expensive and so are normally only used at specialized attendant positions. They also indicate only the busy status of the users' telephones and not actual availability. Furthermore, BLFs show all users and the display is not in any way limited to those persons of current interest to a particular user.

SUMMARY OF THE INVENTION

According to the present invention, a transient message store provides a seamless transition between user presence, one-way message drop-off, and two-way communications. More particularly, the transient message store is used for holding messages between users such that the originator may initiate audio transfer without requiring any action from the destination. This transient message store may be used in the course of communications whenever the two parties are not directly connected to each other. Through the constant re-insertion of the transient store, a user may interact with any number of members in a multi-tasking manner.

Thus, in operation the user can create a group which lists the people with whom the user is closely collaborating and with whom the user may wish to consult on a quick ad hoc basis on issues that arise out of work in progress. Preferably, the system creates a display on the user's telephone or PC of the current availability of members of the group.

Thus, the user is not required to make a series of provisional calls to find someone that he/she can quickly consult with. Instead, the system provides immediate communication with available ones of his/her collaborators and simplified messaging when a collaborator is unavailable. This improves group activities and so improves enterprise efficiency. Improved communication is thereby facilitated within the enterprise, which encourages the forms of trust (competence, integrity and inter-personal) that are needed to allow people to cooperate in an enterprise. It has been demonstrated in sociological research that the encouragement of such trust in an organization improves both execution and innovation.

BRIEF OF DESCRIPTION THE DRAWINGS

A detailed description of the invention is set forth herein below, with reference to the following drawings, wherein:

FIG. 1 shows an exemplary display for indicating to a user the availability of members of a group for the purpose of communication; and FIG. 2 is a block diagram of a system for establishing and maintaining voice communication among a community of interest, according to the preferred embodiment.

DETAILED DESCRIPTION OF THE PREFERRED EMBODIMENT

Before discussing the invention is detail, a brief introduction is set forth below of the basic structure and operation of a tuple space.

A tuple space is a set of type/value ordered pairs called ingles. Each ingle consists of a type (e.g. Name) and a value (e.g. John Doe). Thus, a tuple which describes an employee for a company could, for example, be:

{:name John Doe :age 37 :employee_number 12345
        :start_date 810126 :position T12}

The tuple space enables coordination by allowing queries based on the matching of tuples by anti-tuples. An anti tuple is a tuple that can be used as a query in the tuple space. In form, it is identical to a tuple except that the value of any or all fields may be replaced by a '?' which indicates a 'don't care' condition. Tuple spaces are set up to match tuples with anti-tuples which agree in all fields except for the one(s) indicated by the ? query, which acts as a "wild card". Thus the anti tuple:

{:name ? :age 37 :employee_number ? :start_date ?
    :position T12} would return the tuples for all employees of position T12 who are 37 years old.

Operations on the Tuple Space Include:

Poke—place a tuple in the tuple space. Duration may be specified for how long the tuple should remain in the space. This may be any period up to indefinite.

Peek—query the tuple space with an anti-tuple. This query may be specified to last for any period up to indefinite. Copies of matching tuples are returned through the interface and the tuples remain in the tuple space.

Pick—query the tuple space with an anti-tuple. This query may be specified to last for any period up to indefinite. Copies of matching tuples are returned through the interface and the tuples are removed from the tuple space.

Cancel—with a specified anti-tuple. All matching anti-tuples are removed from the tuple space. Tuples themselves may be removed directly by an appropriate pick request.

Additional operations may be provided such as disclosed in U.K. Patent Application No. 0200745.8 filed Jan. 14, 2002 entitled 'Tuple Space Operations for Fine Grained Control'.

FIG. 1 shows a display generated by the system according to the present invention, which can be implemented as a window in a PC display or as buttons and LCDs on a physical telephone. This display indicates the availability of members of a group that a user may be interested in having quick consultation with, and provides a button (soft or hard) by which the user is able to initiate communication. The boxes to the left of each name indicate availability, connectivity and message status. Thus, any given user may be unavailable (i.e. not logged on to system), or available but busy (i.e. talking to another user, leaving a message for another user, or listening to a message from another user). Thus, the boxes to the left of the user names are representative of LCDs on a telephone or buttons on a PC GUI display to indicate: '*' if intended recipient user is available, '*>' when leaving a message for another user, '<*' when a message is waiting from another user, and '<*>' when a two-way conversation has been established. Thus, in FIG. 1, which shows the community of interest displayed on the phone or PC of a given user, the user has established two-way communication with Janet Bell, Doris Leafloor has left a message for the user, while Judy Wierich, Nick Tsiakas and B. Mcconnell are available.

Turning to FIG. 2, a block diagram is provided of the functional components of the system according to the present invention. A plurality of user software agents 1 is provided representing each user in the system, as is well known in the art. A plurality of device agents 3 are provided for controlling operation of various devices 5 (e.g. telephones, PCs, PC phones, etc.) capable of providing communication between users and displaying user availability. A presence server 7 is implemented as a tuple space for monitoring the availability of each user and communicating same to other users by means of exchanging tuples and anti-tuples, as described in greater detail below. Finally, a communication switch 9 (typically a PBX) provides two-way voice communication between the users via respective device agents and devices (e.g. phones, PC phones, etc.).

In operation, each of the user agents 1 places a tuple in the tuple space to indicate the user's current availability (e.g. the user may directly communicate user availability to his/her agent or the agent may gather information from the user's current work status, calendar entries, location, etc.) The method of gathering this information is outside of the scope of the present invention but would be well understood to a person of ordinary skill in the art (e.g. see the Presence and Availability Management (PAM) Forum for additional information regarding collection of this information (www.pam-forum.org)). The tuple is preferably of the form:

| | | |
|---|---|---|
| <Application> <pro-active> | | |
| <User_Name> <Doris_Leafloor@mitel.com> | { unique user name | |
| <Available> <Yes> | { Yes or No | |

Any user can create multiple groups of other users (referred to herein as 'Pro-active Feature Groups' (PFGs)) with whom he/she wishes to have periodic ad hoc communication. Each PFG may be identified by a Group_Name, Project_ID and a list of unique user names. Thus, with reference to the group shown in FIG. 1, an exemplary PFG format would be:

<Group_Name><Switch Group>
<Project_ID> <X01-704-2X59-262>
<User> <Doris_Leafloor@mitel.com>
<User> <Judy_Weirich@mitel.com>
<User> <H_Krausbar@mitel.com>
<User> <Nick_Tsiakas@mitel.com>
<User> <B_Mcconnell@mitel.com
<User> <Ernst_Munter@mitel.com>
<User> <Lee_Cox@mitel.com>
<User> <Janet_Bell@mitel.com>

Thus, the file consists of a unique name for the group, <Group_Name>, a field to indicate which project this group is associated with, <Project_ID> and unique names for the users whose availability is to be monitored <User>. In common with standard practice, an Email address format is used for the unique user name, although other formats may be used. The exact protocol for establishing communities of interest is outside of the scope off the present application. However, a person of skill in the art will understand that a model that is similar to the existing Instant Messenger paradigm may be used. In such a model, if a first party wishes to add a second party to his/her community list, the first party must first seek and obtain permission from the second party.

Once the user has programmed in various desired groups, he/she can then communicate with his/her user agent 1 to indicate which group of the programmed multiple groups he/she wishes to work with. Alternatively, the user agent 1 can suggest a group to the user based on information derived from other sources. For example, the user agent 1 may determine what project a user is working on by noting his/her physical location, the computer files he/she is using, information in his/her electronic calendar or by other pertinent information. This information can be used to relate the user's activities to a group via information contained in the <Project$_{13}$ ID> field of the PFG. The user agent 1 uses this information to determine which group the user wishes to communicate with.

Once a group has been selected, the user agent 1 initially determines the current status of each of the members of the group by peeking anti-tuples into the tuple space 7, where each anti-tuple is of the form:

```
<Application> <pro-active>
<User_Name> <Doris_Leafloor@mitel.com>
<Available> <?>
```

The user agent 1 is then provided with information on availability of all users whose agents have registered their availability in the tuple space 7. Any user agent 1 who has not registered its user's availability is therefore deemed to be unavailable. The user agent 1 then conveys the user availability information to the user in an appropriate format (e.g. the format of FIG. 1 which includes call buttons for the user to initiate ad hoc communication), such as:

```
<Button> <0>
    <User> <Doris_Leafloor@mitel.com>
    <Available> <Yes>
```

The associated device agent 3 uses this information to properly update the user's communication device 5 in order to display the necessary information, as shown in FIG. 1. The user agent periodically issues further anti-tuples to the tuple space 7 for detecting any changes in availability. Thus, as an example, in the event that the availability status of Doris Leafloor changes from available to unavailable (as a result of her user agent 1 poking the tuple space 7 with the following tuple: `<Application> <pro-active><User_Name> <Doris_Leafloor@mitel.com> <Available> <No>`), a subsequent anti-tuple will return a value which indicates her unavailability. Similarly, as users become available, their user agents post tuples with the ingle `<Available> <Yes>`, such that subsequent anti-tuples from user agents inquiring as to availability will result in such users being available on the display of FIG. 1.

If a user wishes to communicate with a member on his/her community list, the user indicates the member to which communication is to be directed, by pressing the button next to the member's name (i.e. button/indicator to the left of member's name in FIG. 1). The device agent 3 and user agent 1 collaborate to connect the user's device 5 to the transient message store 8. The display at the user's device 5 is then altered to indicate that the user should proceed with recording of a message. For example, the display may change to "*>" with the arrow blinking. As well, an audible tone can be generated to reinforce the indication for the user to record a voicemail message.

Once recording has been completed, the destination user's agent 1 is notified that a message has been sent from a member in his/her community list. The recipient's user agent 1 then communicates with the associated device agent 3 to alter the display on the recipient user's device in order to indicate that a message has been left (e.g. a "<*" symbol set, with the arrow blinking). An audible tone may also be generated to notify the user that a message has been left.

The recipient user may then indicate that he/she wishes to listen to the message by pressing the button adjacent to the sending member's name on his/her device. The associated device agent 3 and user agent 1 collaborate such that the destination device 5 is connected to the transient message store 8, and the message is played. Once the message has been played, the user agent 1 for the recipient is informed in response to which it communicates with the user agent 1 for the originator of the message and determines if the originator is available for a direct connection. If the originator is available (e.g. he/she has not moved on to another member on his/her list), the destination user agent 1 requests that the associated device agent 3 establish a direct connection between the two parties via PBX 9. Each of the user agents 1 (ie. originator and destination) requests that their associated device agents 3 change the displays on the sets 5 to indicate that a two-way communication path has been established between the parties (e.g. "<*>").

Variations and modifications of the invention are contemplated. For example, the method of displaying status information on the sets may be altered if more complex display technologies are available, the method of tracking user availability may be altered as standards evolve, or the transient message store may occur on the end devices as their capabilities increase. All such alternative embodiments are believed to fall within the sphere and scope of the invention as defined by the appended claims.

What is claimed is:

1. Apparatus for establishing and maintaining communication among a group of users defining a community of interest, comprising:
   a plurality of communication devices for voice communication between users of said group, each of said communication devices including a display for indicating communication availability of said users;
   a plurality of device agents for controlling respective ones of said communication devices in establishing said voice communication and updating each said display;
   a plurality of user agents for maintaining user preferences, said user preferences including an indication of said interest with which said group is associated, and a list of said users of said group, and for enabling user selection of said group based on information relating activities of said user to said interest;
   a tuple space for exchanging tuples and anti-tuples between said user agents to monitor said communication availability, in response to which respective ones of said device agents update each respective display;
   a transient voice store for receiving and storing a voice message from a first one of said users to a second one of said users with whom said first user is desirous of communicating and who is indicated on the display of said first user as being available for communication, whereupon the display of said second user is updated to indicate receipt of said voice message, and for playing said voice message to said second user; and
   a communication switch for establishing two-way communication between said users;
   whereby in response to said second user listening to said voice message and provided that said first user is available for communication a voice path is created in said communication switch between said first user and said second user, and in the event said first user is no longer available for communication said second user stores a voice message for said first user via said transient message store.

2. The apparatus of claim 1, wherein said display further includes a button associated with each of said users for initiating communication therebetween.

3. The apparatus of claim 2, wherein said button is illuminated so as to indicate said availability and status.

4. The apparatus of claim 3, wherein said button is illuminated with '*' to indicate user availability, '*>' to indicate leaving a message for another user, '<*' to indicate message waiting, and '<*>' to indicate two-way communication having been established between users.

5. The apparatus of claim 2, wherein said button is an LCD.

6. The apparatus of claim 2, wherein said button is an icon on a PC.

7. The apparatus of claim 1, wherein at least one of said plurality of communication devices is a phone.

8. The apparatus of claim 1, wherein at least one of said plurality of communication devices is a PC.

9. A method for establishing and maintaining communication among a group of users defining a community of interest, comprising:

a) maintaining user preferences, said user preferences including an indication of said interest with which said group is associated, and a list of said users of said group;
b) enabling user selection of said group based on information relating activities of said user to said interest;
c) monitoring communication availability of each user in said group;
d) indicating to each user the communication availability of each other user in said group;
e) receiving and storing a voice message from a first one of said users to a second one of said users with whom said first user is desirous of communicating and who is indicated to said first user as being available for communication;
f) playing said voice message to said second user;
g) in the event said first user is available for communication establishing two-way communication between said users, and otherwise receiving and storing a voice message from said second one of said users to said first one of said users; and
h) playing said voice message to said first user.

10. The method of claim 9, further comprising:
i) in the event said second user is available for communication establishing two-way communication between said users, and otherwise receiving and storing a voice message from said first one of said users to said second one of said users; and
j) playing said voice message to said second user.

11. The apparatus of claim 1, wherein said indication is an identification field to indicate said interest with which said group is associated.

12. The apparatus of claim 1, wherein said user agents suggest said group for selection by said user based on said identification field.

13. The apparatus of claim 12, wherein said information includes at least one of physical location of said user, computer files in use by said user, and electronic calendar data for said user that is related to said identification field.

14. The method of claim 9, wherein said indication is an identification field to indicate said interest with which said group is associated.

15. The method of claim 14, wherein said information includes at least one of physical location of said user, computer files in use by said user, and electronic calendar data for said user that is related to said identification field.

16. The apparatus of claim 1, wherein said interest is a group project.

17. The method of claim 9, wherein said interest is a group project.

18. The apparatus of claim 1, wherein said communication is ad hoc.

19. The method of claim 9, wherein said communication is ad hoc.

* * * * *